United States Patent
Jang et al.

(10) Patent No.: US 7,151,140 B2
(45) Date of Patent: Dec. 19, 2006

(54) PREPARATION METHOD OF DIENE COPOLYMER HAVING IMPROVED ROLLING RESISTANCE AND WET TRACTION

(75) Inventors: Young-Chang Jang, Taejeon (KR); Hyung-Kyu Choi, Taejeon (KR); Shin Han, Taejeon (KR); Young-Hoon Ko, Taejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 10/940,470

(22) Filed: Sep. 14, 2004

(65) Prior Publication Data

US 2005/0176886 A1    Aug. 11, 2005

(30) Foreign Application Priority Data

Feb. 9, 2004    (KR) .................... 10-2004-0008231

(51) Int. Cl.
*C08L 51/08*    (2006.01)

(52) U.S. Cl. .............. 525/332.3; 525/333.1; 525/342

(58) Field of Classification Search ............. 525/332.3, 525/333.1, 342
See application file for complete search history.

(56) References Cited

U.S. PATENT DOCUMENTS

| | | | |
|---|---|---|---|
| 3,244,664 A | 4/1966 | Robert et al. | |
| 3,598,887 A | 8/1971 | Jules et al. | |
| 3,880,954 A | 4/1975 | Kahle et al. | 260/879 |
| 4,397,994 A | 8/1983 | Takeuchi et al. | 525/332.3 |
| 4,555,548 A | 11/1985 | Ueda et al. | 525/237 |
| 4,834,120 A | 5/1989 | Rumez | 132/228 |
| 5,137,998 A | 8/1992 | Hsu et al. | 526/174 |
| 5,219,945 A | 6/1993 | Dicker et al. | 525/276 |
| 6,777,493 B1* | 8/2004 | Ko et al. | 525/100 |
| 6,846,873 B1* | 1/2005 | Ko et al. | 524/492 |
| 2002/0123554 A1* | 9/2002 | Ko et al. | 524/492 |

FOREIGN PATENT DOCUMENTS

| | | |
|---|---|---|
| GB | 1 103939 | 2/1968 |
| JP | 01 101344 | 4/1989 |
| JP | 01 188501 | 7/1989 |
| JP | 03 252431 | 11/1991 |
| JP | 03 252433 | 11/1991 |
| JP | 05 230286 | 9/1993 |

OTHER PUBLICATIONS

Iwakazu Hattori, et al., "Synthesis of Polysoprene with Primary Amino End Groups and Poly(isoprene-b-y-benzyl-L-glutamate)s" Makromol. Chem. 184, pp. 1355-1362 (1983).

Roderic P. Quirk, et al., "Characterization of the Functionalization Reaction Product of Poly(styryl)lithium with Ethylene Oxide", Journal of Polymer Science: Part A: Polymer Chemistry, vol. 26, pp. 2031-2037 (1988).

Roderic P. Quirk, et al., "Carbonation of Polymeric Organolithium Compounds: Effects of Chain End Structure" Journal of Polymer Science: Part A: Polymer Chemistry, vol. 30, pp. 2349-2355 (1992).

* cited by examiner

*Primary Examiner*—Jeffrey Mullis
(74) *Attorney, Agent, or Firm*—Davidson, Davidson & Kappel, LLC

(57) ABSTRACT

The present invention provides a method for preparing a copolymer useful for the manufacture of tires by coupling the ends of a living polymer, obtained from copolymerization of a diene monomers in the presence of an organolithium initiator and a hydrocarbon solvent, with a multi-reactive polysiloxane compound, and subsequently modifying the remaining uncoupled ends of the polymer with an amine compound. The use of the copolymer thus obtained for tire production improves the affinity to silica and greatly enhances the dynamic properties required for tires, such as wet traction and rolling resistance.

12 Claims, No Drawings

PREPARATION METHOD OF DIENE COPOLYMER HAVING IMPROVED ROLLING RESISTANCE AND WET TRACTION

BACKGROUND OF THE INVENTION

1. The Field of the Invention

This invention relates to a method for preparing a diene copolymer. More particularly, this invention relates to a method for preparing a copolymer useful for tire production by mixing isoprene and 1,3-butadiene at a predetermined weight ratio to form a living polymer, coupling the living polymer with a multi-reactive polysiloxane, and subsequently modifying the uncoupled active ends of the living polymer with an organic amine compound.

2. Related Prior Art

Compared with the diene polymer prepared with a Ziegler-Natta catalyst, the diene polymer synthesized using an organolithium initiator is readily more controllable in vinyl content and more excellent in wet traction and rolling resistance. Especially, the polymerization of a diene monomer using an organolithium initiator introduces multiple functional groups to the ends of the polymer to enhance compatibility with silica used as a reinforcing material for tires, reducing rolling resistance or increasing wet traction. The term "rolling resistance" as used herein has a close connection with the rate of fuel consumption of a running vehicle. With an increase in the rolling resistance, the friction force of vehicle tires from the road surface increases to deteriorate the rate of fuel consumption of the vehicle. Otherwise, with a lower rolling resistance, the rate of fuel consumption of the vehicle becomes higher. The rolling resistance is generally expressed in terms of a tan δ value at around 60° C. The lower tan δ value represents a tire material having more excellent in rolling resistance.

Another significant dynamic property of a tire material is wet traction, which is closely connected with the braking performance of a running vehicle body. With an increase in the wet traction, the friction force of vehicle tires from the road surface increases to acquire a higher braking performance. Contrarily, the braking performance deteriorates with a decreased wet traction. The wet traction is generally expressed in terms of a tan δ value at around 0° C. The higher tan δ value represents a tire material having more excellent in wet traction.

In the tire materials, the rolling resistance is the opposite property to the wet traction. Therefore, the tire material that satisfies both the opposite properties is considered to be excellent as a material for tire production.

As an approach to improve the rolling resistance of a diene polymer by decreasing a heat build-up value (based on the fact that, with a decreased heat build-up value of the polymer, the rolling resistance becomes lower to increase the rate of fuel consumption of the tire material), there has been suggested an anionic polymerization method for preparing a diene polymer containing a tertiary amino group (Japanese Patent Laid-Open No. 1989-101344), an alkylsilyl group (Japanese Patent Laid-Open No. 1989-188501), or a halogenated silyl group (Japanese Patent Laid-Open No. 1993-230286). However, the method does not lower the heat build-up value so much as expected and disadvantageously deteriorates the processability of the polymer when admixing it with silica.

Other examples of the method for improving the rolling resistance by reducing the heat build-up value of the diene polymer are the polymerization methods using a silane compound as a coupling agent as disclosed in Japanese Patent Laid-Open Nos. 1991-252431 and 1991-252433. However, these methods cannot also improve the heat build-up value of the diene polymer so much as expected, requiring the use of an excess of a very expensive silane compound to improve the heat build-up value to an expected level.

On the other hand, there are many approaches to balance the opposite properties of the tire material, rolling resistance and wet traction. For example, U.S. Pat. Nos. 4,834,120 and 5,137,998 describe that a polymer having multiple glass transition temperatures as synthesized using an anionic initiator can be improved in both rolling resistance and wet traction. More specifically, the method disclosed in the cited inventions includes synthesizing a polymer having a glass transition temperature in a defined range at a first reactor and then controlling the polymerization condition to make the polymer have a second glass transition temperature. However, a commercial production of the polymer having at least two glass transition temperatures by this method demands high complexity of the synthesis process, elongation of reaction time, and increases in the numbers of polymerization facilities, resulting in a deterioration of productivity.

For improving compatibility of rubber with carbon black, there has been proposed a method of modifying the ends of the polymer molecule with an organic amine compound such as amino benzophenone to provide a rubber composition superior in dynamic and mechanical properties to the existing rubbers (U.S. Pat. No. 4,555,548). However, the rubber synthesized by this method is known to have poor processability during admixing. The use of such a rubber as a tire material hardly provides compatibility with silica, deteriorating mechanical and dynamic properties of tire products. For that reason, the use of the rubber in tire production may cause many difficulties (U.S. Pat. Nos. 4,555,548 and 5,219,945).

In addition, there is an approach to maximize the affinity of rubber to a reinforcing material by polymerizing the rubber in the presence of a functional initiator and then substituting the ends of the rubber molecule with an amine compound or a silicon compound. However, the rubber thus prepared has poor storage stability because of its high cold flow at the ambient temperature (U.S. Pat. No. 6,133,388).

To solve the aforementioned problems, there are many attempts to treat the ends of the anionic living polymer with ethylene oxide (J. Polym. Sci., Part A: Poly. Chem., 26, 2031 (1988)), diphenylethylene (J. Polym. Sci., Part A: Polym. Chem., 30, 2349 (1992)), or N-(benzylidene)trimethylsilylamine (Makromol. Chem., 184, 1355 (1983)). However, the methods still have a limitation in acquiring sufficient compatibility with inorganic filler.

In the preparation of a rubber material for tire production using an anionic polymerization initiator, the coupling agent increases the molecular weight of the polymer and broadens the molecular weight distribution, thus enhancing the mechanical properties of the polymer and improving the processability. The use of a proper coupling agent improves the affinity and compatibility of the rubber material with filler, resulting in enhanced dynamic properties (i.e., increasing wet traction and reducing rolling resistance) required for tires. To achieve this purpose, there have been developed numberless different coupling agents. For example, UK Patent No. 1103939 discloses a method for preparing a polymer using $CO_2$ or $CS_2$ as a coupling agent. However, the coupling agent exhibits a low efficiency and has some problems that the concentration of $CO_2$ is not readily controllable and that $CS_2$ forms a sulfide compound as a byproduct contaminating the polymer product. In like manner, U.S. Pat. Nos. 4,039,633 and 3,468,972 disclose a method for preparing a polymer using a 1,3,5-benzenetricarboxylic acid trihalogen compound and a polyepoxide compound as a coupling agent, respectively. In both cases, the coupling number of the polymer is not readily controllable, and byproducts are formed to discolor the polymer or give out an odor.

Other examples are those methods for preparing a polymer using silicon halide, siloxane, silyl amine, or silyl sulfide as a coupling agent, as disclosed in U.S. Pat. Nos. 3,244,664, 3,692,874, and 3880954, respectively. These methods also form byproducts such as alcohol, amine, thiol, or the like, which act as a poison of the initiator that makes the production yield and the molecular weight of the polymer uncontrollable.

In case of using a tin coupling agent for the ends of a copolymer prepared in the presence of an organolithium initiator by solution polymerization, the compound rubber with carbon black can be improved in both rolling resistance and wet traction due to high compatibility of the tin compound with carbon black. However, the use of the tin compound as a coupling agent provides a weak bond between the tin compound and the polymer (i.e., Sn—C bond), which is readily broken by the physical force and additives during admixing, resulting in a deterioration of mechanical properties. For that reason, the tin-coupled rubber is restricted in its use when admixing with silica where the processing conditions are more rigorous than those used with carbon black (U.S. Pat. No. 4,397,994).

SUMMARY OF THE INVENTION

In an attempt to solve the aforementioned problems in the preparation of diene polymers for a tire material and to develop a rubber more excellent in compatibility with silica than the existing rubber products, the inventors of the present invention have found out that the copolymer comprising two different conjugated diene compounds as prepared by controlling the mixing weight ratio of the conjugated diene monomers, i.e., isoprene and 1,3-butadiene, in a predetermined range can provide a rubber material for tires with greatly enhanced dynamic properties (e.g., wet traction and rolling resistance) without a deterioration of mechanical properties relative to the copolymers prepared at a mixing weight ratio out of the above range, and that the compound rubber prepared by coupling a polymer with a polysiloxane compound, and subsequently modifying the polymer with an organic amine compound can be enhanced in affinity and compatibility with silica.

It is therefore an object of the present invention to provide not only a method for preparing a diene copolymer having improved rolling resistance and wet traction by controlling the mixing weight ratio of monomers but also a method for controlling effectively the molecular weight, the molecular weight distribution and the coupling efficiency of the polymer by a coupling reaction of the polymer with a polysiloxane compound, and subsequently modifying the polymer with an organic amine compound without forming byproducts harmful to the initiator or the reaction system.

To achieve the object of the present invention, there is provided a method for preparing a diene copolymer that includes: (a) mixing an isoprene and a 1,3-butadiene at a weight ratio of 7:3 to 9:1, and performing a copolymerization reaction with an organolithium initiator in the presence of a hydrocarbon solvent and a Lewis base to obtain a living polymer; (b) coupling the ends of the living polymer with a multi-reactive polysiloxane compound represented by the following formula 1; and (c) subsequently modifying the uncoupled active ends of the living polymer with an organic amine compound represented by the following formula 2:

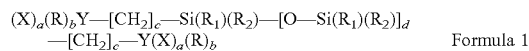

Formula 1 wherein X is a halogen atom; Y is Si or C; R is a lower alkyl group having less than 20 carbon atoms; $R_1$ is the same as R, or a hydrogen atom, a halogen-substituted alkyl group, or a halogen-substituted silane group; $R_2$ is the same as X or $R_1$; a is from 1 to 3; b is (3–a), wherein a+b=3; c is from 1 to 1000; and d is from 1 to 50000,

Formula 2 wherein $R^1$ is a lower alkyl group having less than 20 carbon atoms; and Bz is a benzene ring.

Hereinafter, the present invention will be described in further detail as follows.

The copolymer of the present invention is prepared by copolymerization of two different conjugated diene monomers at a predetermined mixing weight ratio. The conjugated diene monomers include isoprene and 1,3-butadiene.

Preferably, the monomers of the copolymer, isoprene and 1,3-butadiene, are mixed at a weight ratio of 7:3 to 9:1. With the isoprene content in the total monomer composition less than 70 wt. %, the compound rubber has a deterioration of rolling resistance and wet traction. With the isoprene content exceeding 90 wt. %, the compound rubber has a deterioration of mechanical properties with the difficulty in controlling the glass transition temperature ($T_g$) and the Mooney viscosity.

The present invention can prepare a copolymer useful for tire production by polymerizing two different conjugated diene monomers, i.e., isoprene and 1,3-butadiene, at the predetermined mixing weight ratio to form a polymer, coupling the polymer with a multi-reactive polysiloxane compound, and subsequently modifying the ends of the polymer with an organic amine compound.

More specifically, the diene copolymer of the present invention can be obtained by performing a copolymerization reaction of the two monomers with an organolithium initiator in a hydrocarbon solvent to form a living polymer, a coupling reaction at the ends of the living polymer with a coupling agent, and subsequently modifying the ends of the polymer with an organic amine compound.

The specific examples of the organolithium initiator as used in the formation of a living polymer include hydrocarbons containing at least one lithium atom, such as ethyl lithium, propyl lithium, n-butyl lithium, sec-butyl lithium, tert-butyl lithium, phenyl lithium, propenyl lithium, hexyl lithium, 1,4-dilithio-n-butane, 1,3-di(2-lithio-2-hexyl)benzene, etc. The preferred organolithium initiators are n-butyl lithium and sec-butyl lithium. These organolithium initiators can be used alone or in combination with at least two of them. The added amount of the organolithium initiator is variable depending on the desired molecular weight of the polymer produced, and generally 0.1 to 5 mmol per 100 g of the monomers, preferably 0.3 to 3.5 mmol.

The specific examples of the hydrocarbon solvent as used for polymerization include n-hexane, n-heptane, iso-octane, cyclohexane, methylcyclopentane, benzene, toluene, etc. The preferred hydrocarbon solvents are n-hexane, n-heptane, and cyclohexane.

In the solution polymerization, the content of monomers in the hydrocarbon solvent is preferably in the range of 5 to 40 wt. %, more preferably about 10 to 25 wt. %.

The polymerization reaction is initiated with an addition of an organolithium compound and a Lewis base, tetrahydrofuran. The added amount of tetrahydrofuran is preferably in the range of about 50 ppm to 45,000 ppm with respect to the hydrocarbon solvent for polymerization.

The typical polymerization initiation temperature is in the range of about 0 to 60° C., preferably from about 5 to 50° C. With the polymerization initiation temperature lower than 0° C., the viscosity of the solution drastically increases with the progress of the reaction, making it difficult to achieve an active reaction and resulting in an extremely low reaction rate, which is uneconomical. With the polymerization initiation temperature higher than 60° C., the reaction temperature suddenly rises, making it difficult to control the temperature of the reactor. The suitable reaction pressure is in the range of 1 to 10 kgf/cm$^2$.

The polymerization reaction is continued for a sufficient period of time until all the monomers are converted to a copolymer, i.e., until a high conversion is achieved. Typically, the reaction time is in the range of 30 to 200 minutes.

The specific examples of the Lewis base compound used to control the fine structure of the polymer include tetrahydrofuran, N,N,N,N-tetramethylethylenediamine (TMEDA), di-n-propyl ether, di-isopropyl ether, di-n-butyl ether, ethylbutyl ether, triethylene glycol, 1,2-dimethoxybenzene, trimethylamine, or triethylamine. The preferred Lewis base compounds are tetrahydrofuran, and N,N,N,N-tetramethylethylenediamine (TMEDA).

At the time when the solution polymerization is completed, the ends of the living polymer are coupled with a multi-reactive polysiloxane compound, and subsequently the remaining active ends of the polymer are all modified with an organic amine compound to obtain the diene copolymer of the present invention. The polysiloxane compound is a multi-reactive polysiloxane compound represented by the formula 1. The specific examples of the multi-reactive polysiloxane compound of the formula 1 include α,ω-bis(2-trichlorosilylethyl)polydimethylsiloxane, α,ω-bis(2-dichloromethylsilylethyl)poly-dimethylsiloxane, or α,ω-bis(2-chlorodimethylsilylethyl)polydimethylsiloxane.

A coupling reaction of the living polymer with the multi-reactive polysiloxane compound of the formula 1 enhances the affinity and compatibility of the polymer with silica when preparing the compound rubber.

The specific examples of the organic amine compound of the formula 2 include aminobenzophenones such as 4,4-dimethylaminobenzophenone and 4,4-diethylamino-benzophenone.

A subsequent step of modifying the uncoupled active ends of the living polymer with an organic amine compound can further enhance the affinity and compatibility of the polymer with silica.

The content of the polysiloxane halide compound is, based on one mole of the living polymer, in the range of 0.01 to 0.5 mole, preferably 0.05 to 0.2 mole.

The compound of the formula 2 as used for modifying the uncoupled active ends of the living polymer can be added in at least equivalent amount to the active ends.

The Mooney viscosity (ML 1+4@100) of the polymer thus obtained is in the range of 20 to 200, preferably 30 to 160. The vinyl content of the conjugated diene compound is 10 to 90%, preferably 30 to 80%.

Regarding the analysis of the polymer synthesized in the present invention, $^1$H-NMR (Nuclear Magnetic Resonance) is used to measure the microstructure and composition ratio of the conjugated diene compounds, and GPC (Gel Permeable Chromatography) is used to determine coupling efficiency (CE), number average molecular weight ($M_n$), and molecular weight distribution (MWD). The Mooney viscosity of the rubber is analyzed with an SMW-201 Mooney viscometer supplied from Shimadzu Company.

DETAILED DESCRIPTION OF THE INVENTION

Now, the present invention will be described in further detail by way of the following Examples, which are provided to describe the preparation method of an isoprene-1,3-butadiene random copolymer according to the present invention and not intended to limit the scope of the present invention.

EXAMPLE 1

480 g of isoprene, 108 g of 1,3-butadiene, and 3,600 g of cyclohexane were added to a 10L stainless steel reactor, and 29.2 g of tetrahydrofuran was added to the reaction mixture. The inner temperature of the reactor was adjusted to 40° C. while stirring the reaction mixture with an agitator. When the reactor temperature reaches the predetermined temperature, 2.57 mmol of n-butyllithium was added to the reactor to cause an adiabatic warming reaction. The degree of polymerization was determined while observing the change of the reaction temperature, and a small amount of the reaction mixture was collected at any time during the reaction to analyze the conversion. At the time when the reaction temperature is at maximum, another 12 g of 1,3-butadiene was added so as to substitute the active ends of the product with butadiene.

After the another addition of 1,3-butadiene, 0.35 mmol of α,ω-bis(2-trichlorosilylethyl)polydimethylsiloxane of the formula 1 ($M_n$=1,345) as a coupling agent was added to the reactor. The reaction mixture was kept for a predetermined time to cause a coupling reaction.

After the completion of the coupling reaction, 1.50 mmol of 4,4-dimethylaminobenzophenone was added to the reactor to substitute the uncoupled active ends of the polymer with 4,4-dimethylaminobenzophenone, and 6 g (1 phr) of butylated hydroxy toluene (BHT) was added to the reactor to complete the reaction.

The product thus obtained was analyzed in regard to the microstructure by H$^1$-NMR, and the molecular weight, the coupling efficiency and the molecular weight distribution by GPC, and the dynamic property of the rubber by DMTA. The results are presented in Table 2.

EXAMPLE 2

The procedures were performed to prepare an isoprene-1,3-butadiene random copolymer in the same manner as described in Example 1, excepting that 4,4-diethylaminobenzophenone(EAB) as a end modifying agent was used in place of 4,4-dimethylaminobenzophenone(MAB) as presented in Table 1. After the coupling reaction, 6 g (1 phr) of BHT was added to the reactor to complete the reaction. The polymer thus obtained was analyzed in the same manner as described in Example 1. The analysis results of the polymer are presented in Table 2.

TABLE 1

| Div. | Weight ratio of isoprene/1,3-butadiene | Added amount of THF (g) | Added amount of n-BuLi (mmol) | Coupling agent Type | Coupling agent Amount (mmol) | End modifying agent Type | End modifying agent Amount (mmol) |
|---|---|---|---|---|---|---|---|
| Example 1 | 8:2 | 29.2 | 2.57 | PS[1] | 0.35 | MAB[2] | 1.50 |
| Example 2 | 8:2 | 29.2 | 2.57 | PS[1] | 0.35 | EAB[3] | 1.50 |

[1]PS: α,ω-Bis(2-trichlorosilylethyl)polydimethylsiloxane ($M_n$: 1345)
[2]MAB: 4,4-dimethylaminobenzophenone
[3]EAB: 4,4-diethylaminobenzophenone

TABLE 2

| | Coupling efficiency (%) | $M_n$[1] | Mooney Viscosity (ML 1 + 4@100) | Molecular weight distribution |
|---|---|---|---|---|
| Example 1 | 53.3 | 1,126,000 | 101 | 1.23 |
| Example 2 | 46.9 | 951,000 | 95 | 1.17 |

Note:
[1]Number average molecular weight

COMPARATIVE EXAMPLES 1 TO 4

The procedures were performed to prepare an isoprene-1,3-butadiene random copolymer in the same manner as described in Example 1, excepting that the weight ratio of isoprene to 1,3-butadiene and the polymerization conditions were changed as presented in Table 3. After the coupling reaction, 6 g (1 phr) of BHT was added to the reactor to complete the reaction. The polymer thus obtained was analyzed in the same manner as described in Example 1. The analysis results of the polymer are presented in Table 4.

TABLE 3

| Div. | Weight ratio of isoprene/1,3-butadiene | Added amount of THF (g) | Added amount of n-BuLi (mmol) | Coupling agent Type | Coupling agent Amount (mmol) | End modifying agent Type | End modifying agent Amount (mmol) |
|---|---|---|---|---|---|---|---|
| Comparative Example 1 | 5:5 | 64.8 | 2.86 | PS[1] | 0.39 | MAB[2] | 1.70 |
| Comparative Example 2 | 5:5 | 64.8 | 2.86 | PS[1] | 0.39 | EAB[3] | 1.70 |
| Comparative Example 3 | 2:8 | 122.4 | 3.24 | PS[1] | 0.44 | MAB[2] | 1.80 |
| Comparative Example 4 | 2:8 | 122.4 | 3.24 | PS[1] | 0.44 | EAB[3] | 1.80 |

[1]PS: α,ω-Bis(2-trichlorosilylethyl)polydimethylsiloxane ($M_n$: 1345)
[2]MAB: 4,4-dimethylaminobenzophenone
[3]EAB: 4,4-diethylaminobenzophenone

TABLE 4

| | Coupling efficiency (%) | $M_n$[1] | Mooney Viscosity (ML 1 + 4@100) | Molecular weight distribution |
|---|---|---|---|---|
| Comparative Example 1 | 43.8 | 944,000 | 100 | 1.24 |
| Comparative Example 2 | 48.7 | 939,000 | 97 | 1.18 |
| Comparative Example 3 | 51.5 | 872,000 | 97 | 1.16 |
| Comparative Example 4 | 53.2 | 845,000 | 97 | 1.15 |

Note:
[1]Number average molecular weight

RUBBER COMPOSITION EXAMPLES 1 TO 6

The respective polymers prepared in Examples 1 and 2, and Comparative Examples 1 to 4 were admixed with silica, respectively, and the mechanical and dynamic properties of the compound polymers were compared with each other. The admixing conditions are presented in Table 5. The mechanical and dynamic properties after admixing are presented in Table 6 (Composition Examples 1, 2 and 3) for the polymers prepared in Example 1 and Comparative Examples 1 and 3; in Table 7 (Composition Examples 4, 5 and 6) for the polymers prepared in Example 2 and Comparative Examples 2 and 4.

The hardness was measured with a SHORE-A hardness meter. The tensile strength, the 300% modulus and the elongation percentage of the compound rubber were measured with a universal test machine (UTM) according to the ASTM 3189 Method B. The $T_g$ of the compound rubber was measured with a Differential Scanning Calorimeter (DSC-7, Perkin-Elmer). For the dynamic property of the vulcanized rubber, Tan δ value was analyzed with a DMTA 5 supplied from Rheometic Company at a frequency of 10 Hz and under a 0.1% deformation condition.

TABLE 5

| Ingredient | Content (g) |
|---|---|
| Polymer | 100 |
| Stearic acid | 2.0 |
| ZnO | 3.0 |
| Silica #175 | 55 |

TABLE 5-continued

| Ingredient | Content (g) |
|---|---|
| Aromatic oil | 10 |
| Si-69[1] | 4.4 |
| CZ[2] | 1.7 |
| DPG[3] | 1.0 |
| Sulfur | 1.5 |
| Total | 178.6 |

Note:
[1] Si-69: Bis-(triethoxysilylpropyl)tetrasulfane
[2] CZ: N-Cyclohexylbenzothiazyl sulfenamide
[3] DPG: 1,3-Diphenyl guanidine

TABLE 6

| | | Composition Example 1 | Composition Example 2 | Composition Example 3 |
|---|---|---|---|---|
| Copolymer | Sample No. | Example 1 | Comparative Example 1 | Comparative Example 3 |
| | Weight ratio of isoprene/1,3-butadiene | 8:2 | 5:5 | 2:8 |
| | Coupling agent | PS[1] | PS[1] | PS[1] |
| | Modifying agent | MAB[2] | MAB[2] | MAB[2] |
| Compound Mooney viscosity | | 134.4 | 141.3 | 147.8 |
| Hardness (Shore-A) | | 71 | 72 | 73 |
| Tensile strength (kgf/cm$^2$) | | 150.6 | 153 | 154.1 |
| 300% Modulus (kgf/cm$^2$) | | 121.9 | 112.2 | 124.6 |
| Elongation at break (%) | | 358.2 | 379.7 | 352.1 |
| $T_g$ (° C.) of compound rubber | | −19.6 | −19.5 | −20.0 |
| Tan δ at 0° C. | | 0.3218 | 0.3065 | 0.2881 |
| Tan δ at 60° C. | | 0.0544 | 0.0566 | 0.0621 |

[1] PS: α,ω-Bis(2-trichlorosilylethyl)polydimethylsiloxane ($M_n$: 1345)
[2] MAB: 4,4-dimethylaminobenzophenone As can be seen from Table 6, when the isoprene-1,3-butadiene copolymer is prepared using a multi-reactive polysiloxane and 4,4-dimethylaminobenzophenone as a coupling agent and a modifying agent, respectively, with the weight ratio of isoprene to 1,3-butadiene being 8:2, 5:5, or 2:8, there is no such a great difference in the mechanical properties, including tensile strength, modulus, and elongation at break (particularly, when considering the compound Mooney viscosity of the compound rubber, there is no large difference in the mechanical properties). However, with an increase in the weight content of isoprene, the compound rubber exhibits an increased wet traction (Tan δ at 0° C.) and a reduced rolling resistance (Tan δ at 60° C.), which reveals that the dynamic properties of the polymer become much more excellent.

TABLE 7

| | | Composition Example 4 | Composition Example 5 | Composition Example 6 |
|---|---|---|---|---|
| Copolymer | Sample No. | Example 2 | Comparative Example 2 | Comparative Example 5 |
| | Weight ratio of isoprene/1,3-butadiene | 8:2 | 5:5 | 2:8 |
| | Coupling agent | PS[1] | PS[1] | PS[1] |
| | Modifying agent | EAB[2] | EAB[2] | EAB[2] |
| Compound Mooney viscosity | | 137.7 | 140.0 | 146.2 |
| Hardness (Shore-A) | | 72 | 72 | 73 |

TABLE 7-continued

| | Composition Example 4 | Composition Example 5 | Composition Example 6 |
|---|---|---|---|
| Tensile strength (kgf/cm$^2$) | 166.4 | 153.4 | 151.4 |
| 300% Modulus (kgf/cm$^2$) | 121.3 | 118.8 | 127.9 |
| Elongation at break (%) | 389.5 | 365.3 | 349.7 |
| $T_g$ (° C.) of compound rubber | −19.6 | −19.6 | −19.9 |
| Tan δ at 0° C. | 0.3523 | 0.2640 | 0.2508 |
| Tan δ at 60° C. | 0.0558 | 0.0580 | 0.0628 |

[1] PS: α,ω-Bis(2-trichlorosilylethyl)polydimethylsiloxane ($M_n$: 1345)
[2] EAB: 4,4-diethylaminobenzophenone As can be seen from Table 7, when the isoprene-1,3-butadiene copolymer is prepared using a multi-reactive polysiloxane and 4,4-diethylaminobenzophenone as a coupling agent and a modifying agent, respectively, with the weight ratio of isoprene to 1,3-butadiene being 8:2, 5:5, or 2:8, there is no such a great difference in the mechanical properties, including tensile strength, modulus, and elongation at break. However, with an increase in the weight content of isoprene, the compound rubber exhibits an increased wet traction (Tan δ at 0° C.) and a reduced rolling resistance (Tan δ at 60° C.), which reveals that the dynamic properties of the polymer become much more excellent.

It can be seen from Tables 6 and 7 that with an increase in the weight content of isoprene in the isoprene-1,3-butadiene copolymer, the compound rubber has a reduced rolling resistance (Tan δ at 60° C.) and an increased wet traction (Tan δ at 0° C.) without a great deterioration of mechanical properties, showing a great enhancement of the dynamic properties of the polymer.

As described above in detail, the present invention provides a method for preparing a copolymer from the copolymerization of isoprene and 1,3-butadiene at a weight ratio of 7:3 to 9:1 in the presence of a Lewis base, an organolithium initiator, and a hydrocarbon solvent to form a living polymer, coupling the ends of the living polymer with a multi-reactive polysiloxane compound of the formula 1, and subsequently modifying the uncoupled ends of the living polymer with an organic amine compound of the formula 2. The use of the copolymer thus prepared as a tire material enables the tire product to have a greatly increased compatibility with silica in the tire production relative to the conventional products due to the effect of the multi-reactive polysiloxane of the formula 1 and an organic amine compound of the formula 2 as well as the characteristic resulting from the prepared polymer while maintaining predetermined mixing ratios of the monomers. Eventually, the present invention provides the preparation of a rubber having a high wet traction and a low rolling resistance as required for tires in all the compositions using silica as filler.

What is claimed is:

1. A method for preparing an isoprene 1,3-butadiene copolymer, comprising:
   (a) mixing an isoprene to a 1,3-butadiene at a weight ratio of 7:3 to 9:1, but not including styrene, and performing a copolymerization reaction of the isoprene and the 1,3-butadiene in the presence of an organolithium initiator in a hydrocarbon solvent and a Lewis base to obtain a living polymer;
   (b) coupling the ends of the living polymer with a multi-reactive polysiloxane compound represented by the following formula 1; and
   (c) producing a reaction mixture containing a living polymer with uncoupled active ends and subsequently modifying the uncoupled active ends of the living polymer with an organic amine compound represented by the following formula 2, wherein the modification of the uncoupled active ends of the living polymer with an organic amine compound is performed:

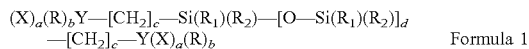

Formula 1 wherein X is a halogen atom; Y is Si or C; R is a lower alkyl group having less than 20 carbon atoms; $R_1$ is the same as R, or a hydrogen atom, a halogen-substituted alkyl group, or a halogen-substituted silane group; $R_2$ is the same as X or $R_1$; a is from 1 to 3; b is (3−a), wherein a+b=3; c is from 1 to 1000; and d is from 1 to 50000,

Formula 2 wherein $R^1$ is a lower alkyl group having less than 20 carbon atoms; and Bz is a benzene ring.

2. The method as claimed in claim 1, wherein the multi-reactive polysiloxane represented by the formula 1 includes at least one selected from the group consisting of α,ω-bis(2-trichlorosilylethyl)polydimethylsiloxane, α,ω-bis(2-dichloromethylsilylethyl)poly-dimethylsiloxane, and α,ω-bis(2-chlorodimethylsilylethyl)polydimethylsiloxane.

3. The method as claimed in claim 1, wherein the organic amine compound represented by the formula 2 is selected from the group consisting of 4,4-dimethyl aminobenzophenone, and 4,4-diethyl aminobenzophenone.

4. The method as claimed in claim 1, wherein the Lewis base is selected from the group consisting of tetrahydrofuran, and N,N,N,N-tetramethylethylenediamine.

5. The method as claimed in claim 1, wherein the Lewis base is used in an amount of 50 to 45,000 ppm with respect to the hydrocarbon solvent.

6. The method as claimed in claim 4, wherein the Lewis base is used in an amount of 50 to 45,000 ppm with respect to the hydrocarbon solvent.

7. The method as claimed in claim 1, wherein the multi-reactive polysiloxane represented by the formula 1 is used in an amount of 0.01 to 0.5 mole based on 1 mole of the living polymer.

8. The method as claimed in claim 1, wherein the multi-reactive polysiloxane represented by the formula 1 is used in an amount of 0.05 to 0.2 mole based on 1 mole of the living polymer.

9. The method as claimed in claim 7, wherein the multi-reactive polysiloxane represented by the formula 1 is used in an amount of 0.05 to 0.2 mole based on 1 mole of the living polymer.

10. The method as claimed in claim 1, wherein the organic amine compound represented by the formula 2 is used in an amount of at least the same number of moles of the living polymer not coupled with the multi-reactive polysiloxane compound.

11. The method as claimed in claim 1, wherein isoprene and 1,3-butadiene are present in an amount of 5 to 40 wt. % in the hydrocarbon solvent.

12. The method as claimed in claim 1, wherein the hydrocarbon solvent is selected from n-hexane, n-heptane, iso-octane, cyclohexane, methylcyclopentane, benzene, or toluene.

* * * * *